United States Patent [19]

Hanawalt

[11] 4,089,678
[45] May 16, 1978

[54] METHOD AND PRODUCT FOR PROTECTING MOLTEN MAGNESIUM

[76] Inventor: Joseph D. Hanawalt, 745 Heatherway, Ann Arbor, Mich. 48104

[21] Appl. No.: 766,378

[22] Filed: Feb. 7, 1977

Related U.S. Application Data

[63] Continuation of Ser. No. 601,391, Aug. 1, 1975, abandoned.

[51] Int. Cl.² ............................................. C22B 26/20
[52] U.S. Cl. ........................................ 75/67 A; 75/96
[58] Field of Search ......................................... 75/67, 96

[56] References Cited

U.S. PATENT DOCUMENTS 2,008,731  7/1935  Stroup ..................................... 75/96
3,400,752  9/1968  Unsworth ............................... 75/96

FOREIGN PATENT DOCUMENTS 404,518  1/1934  United Kingdom ..................... 75/96

OTHER PUBLICATIONS

Couling & Burrier, "First Interim Report on Additional Research on Fluxless Melting of Magnesium," Jul. 30, 1976 (Battelle).

Primary Examiner—Peter D. Rosenberg
Attorney, Agent, or Firm—Harness, Dickey & Pierce

[57] ABSTRACT

An improved process and product for supplying a protective atmosphere of carbon dioxide plus a minor percentage of sulfur hexafluoride ($CO_2/SF_6$) by means of a solid agent consisting of solidified $CO_2$ and $SF_6$ which by sublimation in the presence of molten magnesium and its alloys provides a protective atmosphere of desired composition. This solid agent is used for maintaining a protective atmosphere within a covered vessel containing molten magnesium or its alloys. It is also used for purging a crucible and for flushing the air from a mold cavity prior to the pouring of the molten metal. The amount and the composition of the solid agent can be adjusted to provide the desired composition of protective atmosphere for a wide variety of situations involving molten magnesium.

9 Claims, 3 Drawing Figures

U.S. Patent May 16, 1978 4,089,678
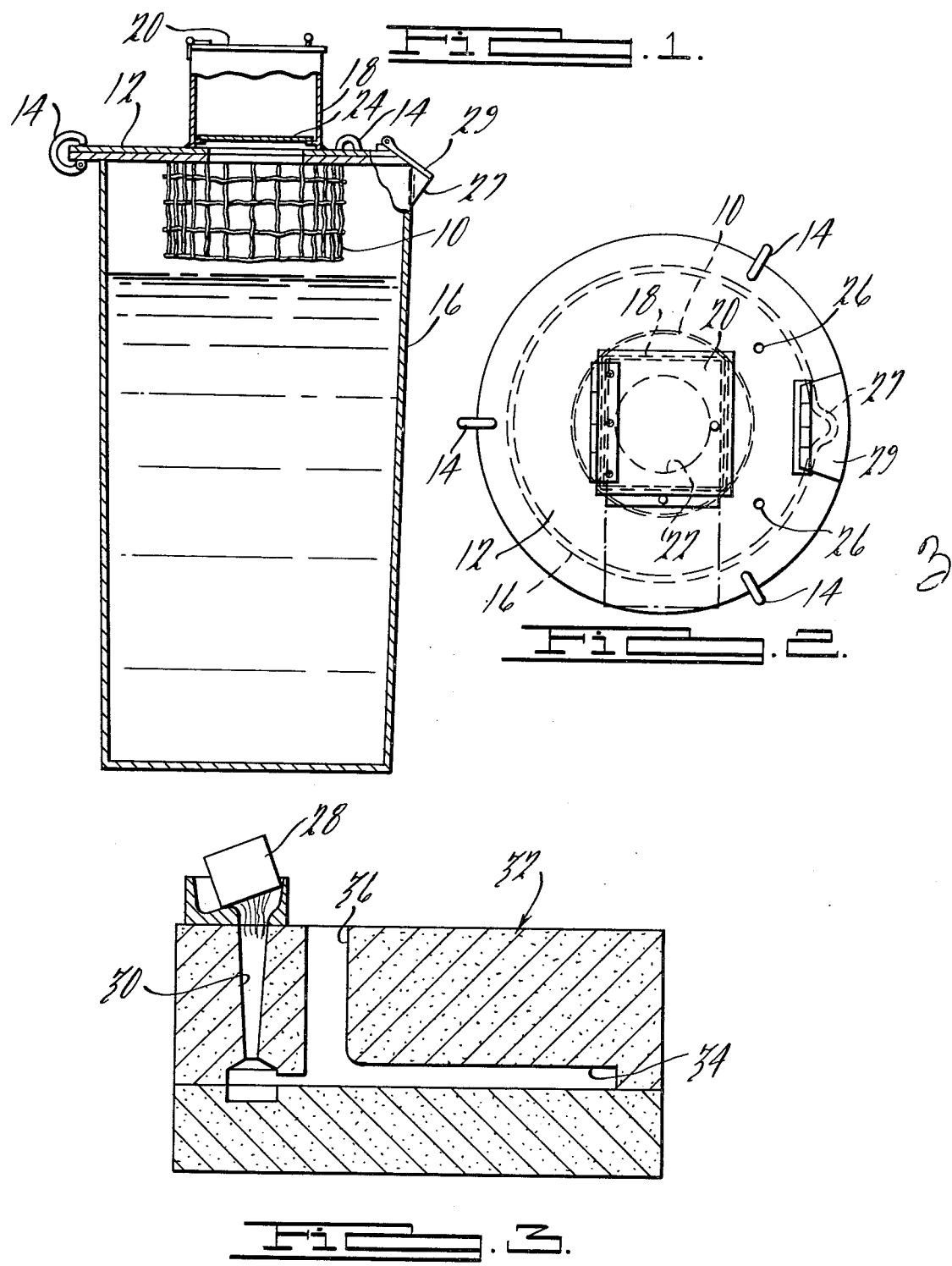

METHOD AND PRODUCT FOR PROTECTING MOLTEN MAGNESIUM

This is a continuation, of application Ser. No. 601,391, filed Aug. 1, 1975 and now abandoned.

BACKGROUND OF THE INVENTION

In recent years it has been established by both laboratory and by production scale experience that certain new atmospheres for the handling of molten magnesium and its alloys are superior to the $SO_2$ inhibited atmospheres as well as the flux techniques which have been in commercial use for many years. Foremost among these new protective atmospheres are an atmosphere of air inhibited by a small concentration of $SF_6$ or an atmosphere of substantially $CO_2$ plus a small concentration of $SF_6$ which is needed to inhibit the oxidation due to the presence of residual air or leakage air in the system. In production scale operations of handling molten magnesium, it is generally impractical to completely eliminate air.

Air plus $SF_6$ inhibitor (air/$SF_6$) is the simplest solution to the problem and is in widespread use particularly for holding pots for magnesium diecasting in which temperatures do not exceed about 1250° F (677° C). A $CO_2$ atmosphere has the advantage that the resultant protective film on the surface of the melt is very thin but more importantly that it is effective to much higher temperatures of about 1600° F (871° C) or even beyond. Consequently, the $CO_2/SF_6$ atmosphere is of more general usefulness, being applicable also to operations of alloying, refining, superheating, and sand casting, etc., which involve higher temperatures.

In current practice when using an air/$SF_6$ atmosphere, since air does not have to be removed from the vessel, only a very small controlled flow of $SF_6$ gas from the supply tank is necessary to maintain the desired concentration of a few tenths percent $SF_6$ at the melt surface. On the other hand, when using a $CO_2/SF_6$ atmosphere in accordance with current practice, the gas flow from the two supply tanks must be sufficient to substantially purge the air from the system. The magnitude of the flow will depend upon the size and configuration of the vessel and the size and shape of the various orifices in the cover of the vessel. The required proportions of $CO_2$ and $SF_6$ in the flow depend upon various factors such as the percent of residual air in the vessel and the temperature of the operations, the required $SF_6$ concentration being higher or higher temperature or more air. Thus for certain production operations the concentration of $SF_6$ in the $CO_2$ flow may be maintained at 0.2% by volume, while for other production operations the concentration of $SF_6$ in the flow may be as high as 3.0% by volume.

In any case attainment, by currently used techniques, of the optimum atmosphere in the vessel requires a connection to the high pressure tank supply and control of the composition by use of valves and gauges. For large stationary installations such an inflexible connection presents no problem, but for transportable vessels the necessity for piping to the gas supply tanks is a source of considerable inconvenience. Some industrial installations go to the extreme of carrying the gas tanks along with the transportable vessel. Obviously, for smaller crucibles such as are transported around a foundry, the problem has been most difficult. The thin protective film which forms on the melt surface is not permanent, but on the contrary loses its protective nature within a few minutes after removal from contact with the protective atmosphere, so that the gas shield must be constantly maintained.

SUMMARY OF THE INVENTION

The purpose of the invention here described is to make possible the supply and continuing maintenance of a protective atmosphere of $CO_2/SF_6$ without the necessity of any connections with a tank gas supply. This is accomplished by the use of a new agent which is a solid product comprised of solidified $CO_2$ and $SF_6$. This solid agent may be produced in various ways. The essential characteristic is that the gaseous atmosphere of $CO_2/SF_6$ occurs by the sublimation of the solidified compounds $CO_2$ and $SF_6$. Use of this new solid agent avoids the necessity of connections by pipes and valves to high pressure tank reservoirs of $CO_2$ and $SF_6$ and thus offers advantages of flexibility and convenience especially for small or transportable vessels.

The precise method of manufacture of solid $CO_2$ and of solid $SF_6$ do not constitute a part of the present invention, inasmuch as methods of manufacture of these products are known in the art. However, a product consisting of a sublimable mixture of $CO_2$ and $SF_6$ has not heretofore been known or used, insofar as I am aware, and its use in this art is believed to be without precedent also.

For percentages of $SF_6$ up to its liquid solubility in liquid $CO_2$ under pressure, a solid agent having the desired ratio of the two compounds may be produced by the methods used for the production of the well-known "dry ice". The "effective" liquid solubility range may be expanded if desired by causing an intimate mixing of the liquid by mechanical or other means. The "snow" resulting from the expansion-cooling step may be pressed into convenient sized cakes or tablets. Alternatively the "snow" of expansion-cooled $CO_2$ and the "snow" of independently expansion-cooled $SF_6$ may be mixed in the proportions desired in the $CO_2/SF_6$ agent, and pressed into convenient sized cakes or tablets of the solid agent. The cakes or tablets will then automatically supply the desired mix when used as hereinafter described. In another technique, the "snow" of the expansion-cooled $CO_2$ is pressed into conveniently sized small tablets of solid $CO_2$ and the "snow" of the separately expansion-cooled $SF_6$ is pressed into pellets of solid $SF_6$. The solid pellets of $SF_6$ are mixed with the solid $CO_2$ tablets by the user in any desired ratio, to make up an agent of the desired proportions to produce by sublimation the optimum gaseous composition in and for the specific vessel containing the molten magnesium.

The rate of sublimation can be adjusted effectively by controlling the insulation surrounding the agent, which may be exposed directly to the radiation from the molten surface or may be shielded or enclosed in graphite cloth or other suitable material.

Within a covered crucible the mixed subliming agent may be placed in a cage to constantly purge the interior thereof of air and to constantly replenish the amount of $CO_2/SF_6$ gas which may escape. The agent of my invention can also be directly placed within an empty crucible for purging the air therefrom, whereafter molten magnesium can be poured into the crucible and directly over any residual agent remaining therein.

It will be understood in the preceding discussion of methods of controlling the ratios of the sublimed gases $CO_2$ and $SF_6$ that, for example, the relative rates of sublimation of the solid $CO_2$ tablets and the solid $SF_6$ pellets may be further accurately manipulated by enclosing the two solids in separate envelopes of e.g. different thicknesses of graphite cloth. The different sublimation temperatures ($CO_2$ at $-78°$ C and $SF_6$ at $-63.8°$ C) together with the thermal insulation control by different layers of graphite cloth make possible any desired relative concentrations of the two gases. Obviously, also, if the desired atmosphere is the simpler one, air/$SF_6$, which is satisfactory under some conditions as noted, then only the solid $SF_6$ agent is used.

BRIEF DESCRIPTION OF THE DRAWINGS

FIG. 1 is a view mainly in vertical section but partly in side elevation of a covered crucible in conjunction with which the present invention is adapted to be used, incorporating a basket on the underside of the cover thereof for retaining a preselected quantity of the agent $CO_2/SF_6$;

FIG. 2 is a plan view of the crucible shown in FIG. 1; and

FIG 3 is a transverse vertical sectional view of a typical mold into which molten magnesium is adopted to be poured for forming magnesium castings.

DESCRIPTION OF THE PREFERRED EMBODIMENTS

The present invention in part concerns a special technique for the introduction and maintenance of the $CO_2/SF_6$ atmosphere over the magnesium in place of the usual technique of controlled gaseous flow through pipes from pressure tanks of $CO_2$ and $SF_6$.

Since the solid agent $CO_2/SF_6$ is at a temperature of about $-110°$ F, one might be very concerned about the consequences if a piece accidentally escaped the container and became submerged in molten magnesium at a temperature of over 1200° F. Surprisingly, after extensive testing, it has been established that no violence occurs on the contact of dry ice with molten magnesium.

It is observed that if a lump of dry ice is placed on the surface of the melt, the dry ice simply sublimes at a somewhat quickened rate. If the lump of dry ice is submerged in the molten magnesium by pushing it through the melt surface or by dropping it from sufficient height so that its momentum carries it through the melt surface, a magnesium "balloon" or "hemisphere" is instantly, but not violently, formed on the surface of the melt. The hemisphere always has a hole somewhere which permits any continuing evolution of $CO_2$ gas to escape without generating pressure within. This experiment has been performed many times and clearly substantiates the practicality of using dry ice in proximity to molten magnesium without potential hazard to the operator.

The feasibility of utilizing a material like dry ice was demonstrated by a series of tests conducted on a 2-pound scale, a 16-pound scale and, finally, on a production scale size of 300 pounds. For each of these sizes of crucibles, two different methods of handling the dry ice were employed. It will be understood, however, that other methods of handling the agent may be employed since the main requirement is to insure that the sublimation rate is sufficient to keep the covered crucible effectively purged of air. While a greater rate than this has no harmful consequences, it would be unnecessarily wasteful of the agent. The tighter fitting the cover and the smaller the various exit holes, the less the required sublimation rate to keep the air from getting in. In practice, the rate of sublimation can be controlled within wide limits by providing more surface of the agent exposed to the heat or, on the other hand, by providing more insulation from the source of the heat. Layers of ¼-inch thick graphite felt can be used very effectively for insulation.

Referring now to FIGS. 1 and 2 of the drawing, one method used is to place the lumps of dry ice in a wire basket 10 suspended from the underside of a crucible cover 12 secured by means of clamps 14 on the upper flange of a crucible 16. In accordance with a preferred embodiment, a cubicle storage chamber 18 is mounted on the upper surface of the cover 12 and is formed with a hinged lid 20 to enable the filling of the storage chamber with a supply of the subliming agent. The crucible cover at the base of the storage chamber is formed with a port or aperture 22 which is selectively closed or opened by means of a slide door 24 slidably mounted on the cover. In accordance with the foregoing arrangements, periodic manipulation of the slide door 24 effects a discharge of the agent through the port 22 into the wire basket to replenish that amount which has become consumed by sublimation, thereby assuring the maintenance of an appropriate $CO_2/SF_6$ protective atmosphere above the melt.

It will be further noted in FIGS. 1 and 2 that the crucible cover 12 is provided with two access ports 26 for the purpose of venting the interior of the crucible above the melt, as well as providing for access to the melt, such as with a thermocouple, to measure the temperature thereof and for the introduction of supplemental additives. In addition to the foregoing, the upper edge of the crucible adjacent to the cover is formed with a pouring spout 27 which is normally closed by a hinged spout lid 29.

For a 300-pound crucible at 1400° F (about 16 inches diameter by 3 feet deep), 3 pounds of dry ice lasts about 10 minutes.

The second method used is to float a 14½ inch diameter graphite "boat" (not shown) directly on the melt surface and to drop the lumps of agent into this boat through a port corresponding to the port 22 in the cover. The graphite boat is very hot in this case and dry ice will sublime unnecessarily rapidly unless a layer or two of graphite felt cloth is placed in the boat to insulate the dry ice from the heat.

A further use of the subliming solid agent $CO_2/SF_6$ is in the flushing of the air out of a mold before pouring the molten metal. The $CO_2/SF_6$ is supplied in a typical situation as shown in FIG. 3 by placing a piece of the agent 28 over the down sprue 30 of a mold 32 for a period of time before pouring. The $CO_2/SF_6$ atmosphere, being heavier than air, purges the mold cavity 34 of air, which escapes through the riser 36.

As used in the present application, the word "magnesium" is to be construed as including alloys of magnesium.

This Description of the Preferred Embodiments, and the accompanying drawings, have been furnished in compliance with the statutory requirement to set forth the best mode contemplated by the inventor of carrying out the invention. The prior portions consisting of the "Abstract of the Disclosure" and the "Background of the Invention" and "Summary of the Invention" are furnished without prejudice to comply with administrative requirements of the Patent Office.

What is claimed is:

1. A reaction inhibiting agent for forming a protective atmosphere over molten magnesium by sublimation, comprising a solidified solution consisting of carbon dioxide having dissolved therein a proportion of sulfur hexafluoride lying within the range of two tenths of one percent to three percent of the total.

2. A reaction inhibiting agent for forming a protective atmosphere over molten magnesium by sublimation comprising a solidifid solution consisting of carbon dioxide having dissolved therein a proportion of sulfur hexafluoride adequate to inhibit oxidation of the magnesium.

3. A protective agent for molten magnesium and its alloys composed of a mixture of solidified carbon dioxide and a proportion of solidified sulfur hexafluoride adequate to inhibit oxidation of the magnesium.

4. A protective agent as defined in claim 3 which provides an atmosphere of carbon dioxide and sulfur hexafluoride in the volumetric ratio carbon dioxide/sulfur hexafluoride of about 100:1.

5. A solid agent as in claim 3 wherein the mixture is comprised of discrete particles of solidified carbon dioxide and separate discrete particles of solidified sulfur hexafluoride, whereby the ratio of carbon dioxide/sulfur hexafluoride gas given off by sublimation can be varied by varying the relative proportions of the particles in the mixture.

6. A solid agent as in claim 3 wherein the proportion of solid sulfur hexafluoride lies within the range of two tenths of one percent to three percent.

7. A process of protecting molten magnesium from oxidation attack which comprises placing an agent comprising solidified sulfur hexafluoride in such quantities and in such proximity to the magnesium as to cause sublimation of the sulfur hexafluoride at a rate which furnishes a protective atmosphere above the magnesium consisting of a proportion of not more than a few tenths percent of sulfur hexafluoride mixed with air.

8. A process as defined in claim 6 wherein the agent is placed in a pervious support disposed above the exposed surface of the molten magnesium.

9. A process as defined in claim 6 wherein the agent is placed in a heat-resistant support having heat insulating material incorporated therein and disposed in floating relationship on the surface of the molten magnesium.

* * * * *

UNITED STATES PATENT AND TRADEMARK OFFICE
CERTIFICATE OF CORRECTION

PATENT NO. : 4,089,678
DATED : May 16, 1978
INVENTOR(S) : HANAWALT, Joseph D.

It is certified that error appears in the above-identified patent and that said Letters Patent are hereby corrected as shown below:

Column 1, line 49 after higher "or" should be --for--

Signed and Sealed this

Twenty-sixth Day of September 1978

[SEAL]

Attest:

RUTH C. MASON
*Attesting Officer*

DONALD W. BANNER
*Commissioner of Patents and Trademarks*